United States Patent
Iida

(10) Patent No.: US 8,424,297 B2
(45) Date of Patent: Apr. 23, 2013

(54) VEHICLE COMPONENT AND ENGINE COMPONENT FOR SUPPLYING SECONDARY AIR

(75) Inventor: Akira Iida, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 937 days.

(21) Appl. No.: 12/279,590

(22) PCT Filed: Feb. 15, 2007

(86) PCT No.: PCT/IB2007/000753
§ 371 (c)(1),
(2), (4) Date: Aug. 15, 2008

(87) PCT Pub. No.: WO2007/093915
PCT Pub. Date: Aug. 23, 2007

(65) Prior Publication Data
US 2009/0013680 A1 Jan. 15, 2009

(30) Foreign Application Priority Data

Feb. 17, 2006 (JP) .................... 2006-040762

(51) Int. Cl.
*F01N 3/34* (2006.01)
(52) U.S. Cl.
USPC ............................................. 60/305; 60/322
(58) Field of Classification Search ............ 60/304–307, 60/322, 323
See application file for complete search history.

(56) References Cited

U.S. PATENT DOCUMENTS

| 4,630,439 A | 12/1986 | Hudson, Jr. |
| 5,916,137 A | 6/1999 | Hayashi |
| 6,341,664 B1 * | 1/2002 | Gerber ................... 181/282 |

FOREIGN PATENT DOCUMENTS

| CN | 1043646 A | 7/1990 |
| DE | 24 27 226 | 7/1975 |
| JP | 50-90813 | 7/1975 |
| JP | 56-139233 | 10/1981 |
| JP | 61-279723 | 12/1986 |
| JP | 7-233765 | 9/1995 |
| JP | 09-125948 | 5/1997 |
| JP | 2004-162682 | 6/2004 |
| JP | 2004-211659 | 7/2004 |

OTHER PUBLICATIONS

Notification of Reason(s) for Refusal issued Sep. 29, 2009, for JP Application No. 2006-040762.
Notification of Reason(s) for Refusal for JP Appl. No. 2006-040762 dated Feb. 23, 2010.
Notification of the First Office Action for CN 200780005469.2 dated Mar. 24, 2010.

* cited by examiner

*Primary Examiner* — Thomas Denion
*Assistant Examiner* — Jonathan Matthias
(74) *Attorney, Agent, or Firm* — Finnegan, Henderson, Farabow, Garrett & Dunner, LLP

(57) ABSTRACT

An AI pipe (1) is formed with a first housing (11) and a second housing (21). The first housing (11) is made from a thin metal sheet and has a clamp portion (C1) that was left remaining. The second housing (21) is also made of a thin metal sheet and also has a clamp portion (C2) that was left remaining. When fitted together, the first housing (11) and the second housing (21) form a pipe portion (31). With this AI pipe (1), a through-hole (H) which is punched out by press working is formed in at least one of the clamping portion (C1) and the clamping portion (C2).

11 Claims, 2 Drawing Sheets

VEHICLE COMPONENT AND ENGINE COMPONENT FOR SUPPLYING SECONDARY AIR

CROSS-REFERENCE TO RELATED APPLICATIONS

This application is a national phase application of International Application No. PCT/IB2007/000753, filed Feb. 15, 2007, and claims the priority of Japanese Application No. 2006-040762, filed Feb. 17, 2006, the contents of both of which are incorporated herein by reference.

BACKGROUND OF THE INVENTION

1. Field of the Invention

The invention relates to a vehicle component and an engine component for supplying secondary air. More particularly, the invention relates to a vehicle component and an engine component for supplying secondary air having a clamping portion which is necessary during manufacture of the parts that has been left remaining.

2. Description of the Related Art

When performing processes such as forming, assembling, and welding a part (hereinafter also referred to as "work") using production equipment during manufacture of the part, typically the work is first positioned on the production equipment and then clamped down at an appropriate portion by a suitable method according to the degree necessary to ensure manufacturing quality of the work, for example. If the work is not able to be held sufficiently by the production equipment due to, for example, the shape or strength of the work, the work may be provided with a special clamping portion so that it can be easily held. With parts such as those formed by press working which use a thin metal sheet as the raw material, for example, the work may not be able to be held sufficiently during press forming using only the portion necessary for the work to function. Also, if a portion necessary for the work to function is carelessly or improperly held, that portion may be damaged. Therefore, such parts may be provided with a clamping portion that is separate from portion necessary for the work to function. Japanese Patent Application Publication No. JP-A-2004-162682, for example, describes technology using a press-formed part.

More specifically, Japanese Patent Application Publication No. JP-A-2004-162682 describes a secondary air supply structure to supply secondary air to an exhaust port of an internal combustion engine. Japanese Patent Application Publication No. JP-A-2004-162682 also describes a heat insulator for covering an exhaust manifold as a constituent element of this secondary air supply structure. The heat insulator includes a heat insulator cover portion and a heat insulator flange portion. A groove having an open portion with a concave cross section that extends in the direction in which the cylinders are aligned is formed in the heat insulator flange portion. Japanese Patent Application Publication No. JP-A-2004-162682 describes press forming the groove into a flat heat insulator flange portion in order to form the groove by a simpler manufacturing process.

Meanwhile, Japanese Patent Application Publication No. JP-A-2004-211659 describes a heat insulator having a structure in which front heat insulator and a back heat insulator are laminated together. Japanese Patent Application Publication No. JP-A-2004-211659 describes manufacturing the heat insulator by press forming the front and back heat insulators with two thin metal sheets stacked on top of one another so that the front and back heat insulators will be generally the same shape.

The clamping portion described above may be left on the part even after the part is finished, even though it is no longer necessary and increases the weight of the part. The reason for this is that removing the clamping portion after the part is finished would require a change in a pre-existing manufacturing process due to the addition of special processing equipment necessary for the removing the clamping portion, for example, and such an investment in new equipment and the like would greatly increase costs. Therefore, the clamping portion, although unnecessary for the part to function, is often left on to avoid this. Also, although there is no specific mention of this clamping portion in Japanese Patent Application Publication No. JP-A-2004-162682 and Japanese Patent Application Publication No. JP-A-2004-211659, when a clamping portion is left on a part such as the insulator described above which is made of thin metal sheets, not only does it increase the weight, but it may also produce vibration noise in the vehicle.

SUMMARY OF THE INVENTION

This invention thus provides a vehicle component and an engine component for supplying secondary air, which reduce extra weight as well as vibration noise caused by a clamping portion, and keep the costs necessary to realize these reductions in weight and vibration noise down.

A first aspect of the invention relates to a vehicle component including a part made of metal and having at least one clamping portion which is to be fixed to production equipment when the part is formed by press working, which is characterised in that at least one through-hole is formed in the at least one clamping portion. Based on the foregoing reason for leaving the clamping portion, the clamping portion is left to remain after the vehicle component is finished. This invention, however, a through hole is formed in the clamping portion. Also, when the clamping portion is left remaining, particularly on a part that is made of metal and press formed, that clamping portion may cause vibration noise, and the level of that vibration noise depends on the area of the clamping surface. In view of this, the invention aims to reduce the area of the clamping surface by forming a through-hole in it, and thus reduce the vibration noise that radiates from the clamping surface. Accordingly, the invention enables a reduction in the extra weight from the clamping portion that is left remaining, as well as a reduction in the vibration noise caused by that remaining clamping portion.

Also, in the foregoing vehicle component, a through-hole may be formed by being punched out by press working. According to the invention, when machining the part, the through-hole is formed by punching during press working in view of the fact that completing the part in a single manufacturing process rather than through a plurality of manufacturing processes enables operation time (labor hours) and management time (man-hours for management) and the like to be reduced, as well as the fact that an extremely high degree of machining accuracy is not required in light of the purpose of the through-hole to be formed. According to the invention, punching out the through-hole in the same manufacturing process as the manufacturing process in which the press work for forming the part and the like is performed obviates the need for equipment and the like to perform machining. Therefore, there is no need to invest in new equipment or time spent on labor and management and the like can be reduced to less than those required to form the through-hole and finish the part using another manufacturing process for machining, thus enabling an increase in cost to be kept down to a large degree. Also, forming the through-hole does not change the outer shape of the clamping portion so according to the invention, even if the through-hole is formed by punching beforehand, the part can still be held sufficiently by the clamping portion during press forming. Incidentally, because it is possible that the formed part may deform if the punching or the like is performed after the part is formed, the part is generally formed after punching is performed in the manufacturing process in which the press work is performed.

Also, a second aspect of the invention relates to a secondary air supply component of an internal combustion engine, which includes i) a first part made of metal and having a first wall section that forms a part of a secondary air passage and that is formed by press working using production equipment, and a first clamping portion that is to be fixed to the production equipment when the first wall section is formed by the press working, and ii) a second part made of metal and having a second wall section that forms the other part of the secondary air passage and that is formed by press working using production equipment, and a second clamping portion that is to be fixed to the production equipment when the second wall section is formed by the press working, wherein the second part is fit together with the first part to form the secondary air passage. This secondary air supply component of an internal combustion engine is characterised in that a through-hole is formed in at least one of the first clamping portion and the second clamping portion. Here, the secondary air supply component of an internal combustion engine is a part for supplying secondary air to an exhaust system of an internal combustion engine. With the secondary air supply component, a large excitation force is transmitted to the remaining clamping portion due to fluctuation in exhaust gas pressure or the like of the internal combustion engine so loud vibration noise in particular tends to be produced, which tends to have an adverse effect on the quietness of the vehicle. In contrast, according to the invention, the vibration noise and weight attributed to the clamping portion that was left remaining can be reduced just like the first aspect of the invention described above, and moreover, the costs necessary to realize these reductions in weight and vibration noise can be kept down.

Accordingly, the invention makes it possible to provide a vehicle component and an engine component for supplying secondary air, which reduce both the extra weight as well as the vibration noise caused by that clamping portion, and keep the costs necessary to realize these reductions in weight and vibration noise down.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of exemplary embodiments.

Figure 1:
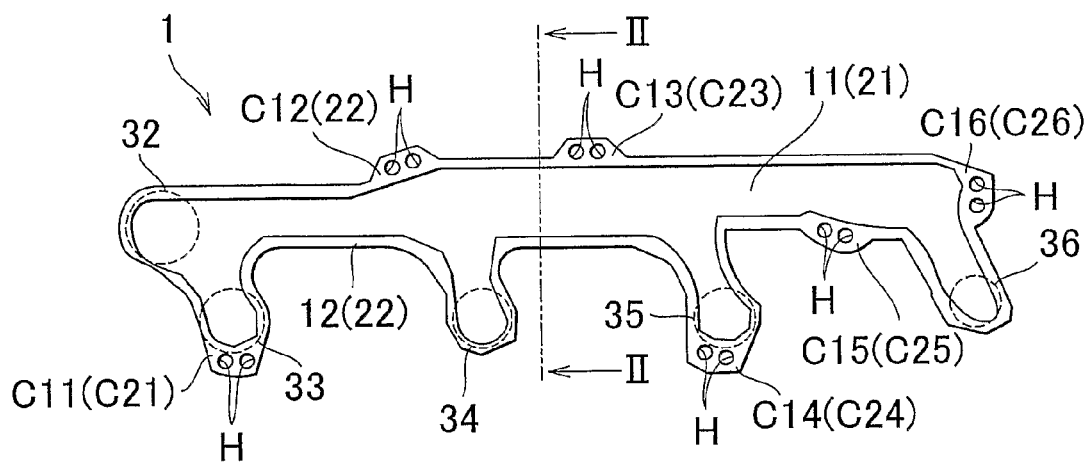
FIG. 1 is a view of an AI pipe according to an example embodiment of the invention.
Figure 2:
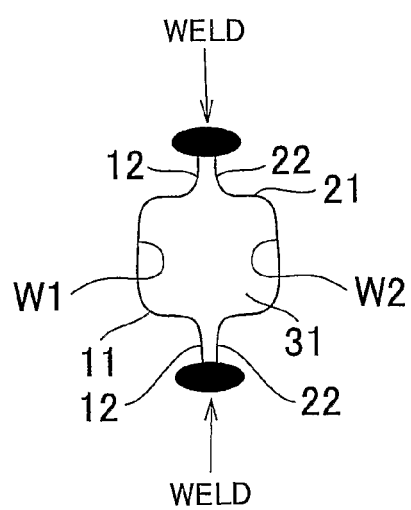
FIG. 2 is a sectional view taken along line of the AI pipe shown in FIG. 1.

FIG. 1 is a view of a frame format of a sketch of an AI (Air Injection) pipe 1 according to an example embodiment of the invention. FIG. 2 is a sectional view of a frame format taken along line the AI pipe 1 shown in FIG. 1. This AI pipe 1 includes a first housing (a first part) 11 and a second housing (a second part) 21. More specifically, the AI pipe 1 is formed by putting a first flange portion 12 of the first housing 11 and a second flange portion 22 of the second housing 21 together and joining them by welding. The first and second flange portions 12 and 22 are formed along the peripheral edges of first and second wall sections W1 and W2 which will be described later. The first and second housings 11 and 21 are parts which are made of thin metal sheets. The material of which the thin metal sheets are made may be selected from materials having suitable strength, excellent heat resistance, and which are easy to press form. For example, the thin metal sheets may be made of a light alloy such as aluminum alloy. The first housing 11 is a part that is formed by press working. The first wall section W1 which forms a pipe portion (i.e., a secondary air passage) 31 is formed in the first housing by press working. Similarly, the second wall section W2 which forms the pipe portion 31 is formed in the second housing 21 by press working. Also, an inflow portion 32 and outflow portions 33, 34, 35, and 36 which provide communication between the pipe portion 31 and the outside are formed in the second housing 21. The inflow portion 32 and the outflow portions 33, 34, 35, and 36 are formed by punching out portions of the second housing 21 in advance prior to press forming.

Figure 3:
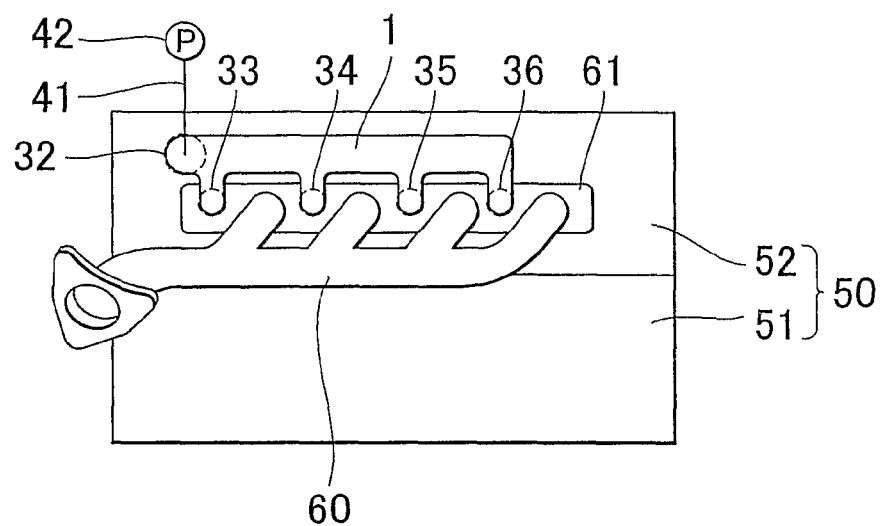
FIG. 3 is a view showing a frame format of the AI pipe assembled to an internal combustion engine.

FIG. 3 is a view showing a frame format of the AI pipe 1 assembled to an internal combustion engine 50. The internal combustion engine 50 has a cylinder block 51 and a cylinder head 52. The cylinder block 51 has a four inline cylinder configuration. An exhaust port, not shown, for discharging exhaust gas is formed for each cylinder in the cylinder head 52. Moreover, communicating holes, not shown, are formed for each exhaust port in the cylinder head 52. These communicating holes extend from the surface to which a manifold flange portion 61 of an exhaust manifold 60 is fastened through to the exhaust ports. A plurality of communicating holes, also not shown, that are connected to each of the communicating holes in the cylinder head 52 are formed through the manifold flange portion 61 from the surface of the manifold flange portion 61 that abuts against the cylinder head 52 to the surface on the opposite side. The AI pipe 1 is joined by welding, for example, to the manifold flange portion 61 while the outflow portions 33, 34, 35, and 36 are connected with the communicating holes in the manifold flange portion 61. Meanwhile, an air supply pipe 41 which is connected to an air pump 42 at one end is connected to the inflow portion 32 at the other end where it is joined by welding, for example. Pressurized air delivered from the air pump 42 flows from the inflow portion 32 into the pipe portion 31 through the air supply pipe 41. Moreover, the pressurized air flowing into the pipe portion 31 flows out from the outflow portions 33, 34, 35, and 36 to the exhaust ports via the communicating holes formed in the manifold flange portion 61 and the communicating holes formed in the cylinder head 52. Accordingly, pressurized air is supplied as secondary air to the exhaust ports and unburned components in the exhaust gas are purified by an oxidation reaction that takes place within a three way catalyst, not shown, provided in the exhaust system.

When the first wall section W1 is formed by press working, the first housing 11 is held to the production equipment by first clamping portions C11, C12, C13, C14, C15, and C16 (hereinafter simply referred to as "clamping portions C1" when referred to collectively) shown in FIG. 1. Also, the clamping portions C1 remain on the first housing 11 even after the AI pipe 1 is finished. Similarly, when the second wall section W2 is formed by press working, the second housing 21 is held to the production equipment by second clamping portions C21, C22, C23, C24, C25, and C26 (hereinafter simply referred to as "clamping portions C2" when referred to collectively). Also, the clamping portions C2 remain on the second housing 21 even after the AI pipe 1 is finished. Both clamping portions C1 and C2 are formed extending from the first and second flange portions 12 and 22, respectively, out beyond the widths of the first and second housings 11 and 21 of the flange portions 12 and 22. In addition, the clamping portions C1 and C2 are formed so that the necessary area for holding the AI pipe 1 to the production equipment can be ensured with the clamping surfaces. However, when the clamping portions C1 and C2 are left on after the AI pipe 1 is finished, they increase the weight of the AI pipe 1 and may generate vibration noise. This example embodiment, however, reduces that weight and vibration noise in the following manner.

Figure 4:
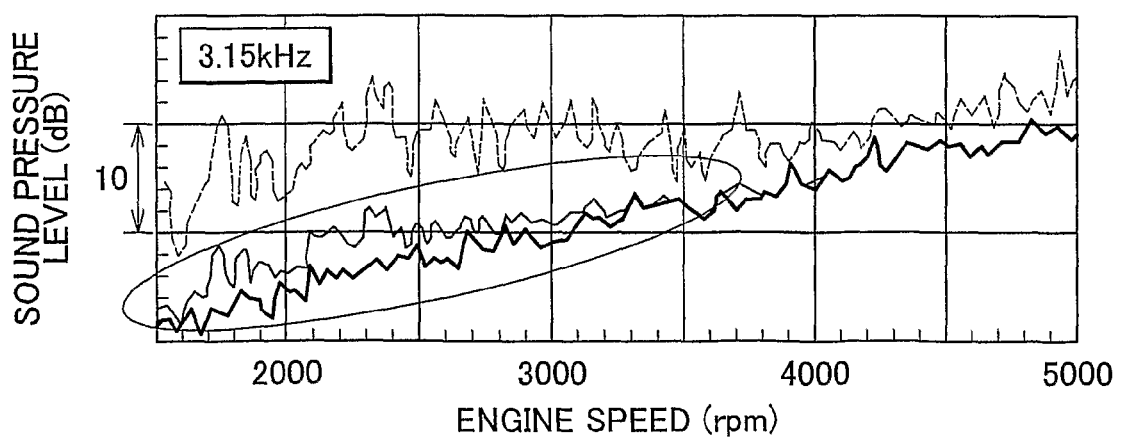
FIG. 4 is a graph showing the relationship between sound pressure and speed of the internal combustion engine with the AI pipe according to the example embodiment and AI pipes according to related art.

Two through-holes H are formed in each of the clamping portions C1 and C2 shown in this example embodiment. The through-holes H are generally circular holes, and in this example embodiment, all of the through-holes H formed in all of the clamping portions C1 and C2 are substantially the same size. Forming these through-holes H reduces the weight by an amount corresponding to the portions where the through-holes H were formed. Also, the area of the clamping surface of the clamping portions C1 and C2 can be reduced by an amount corresponding to the portions where these through-holes H were formed so even if a large excitation force is transmitted to these clamping portions C1 and C2 due to, for example, fluctuation in exhaust gas pressure of the internal combustion engine 50, vibration noise radiated from the clamping surfaces of the clamp portions C1 and C2 can be reduced. FIG. 4 is a graph showing the relationship between the sound pressure level and the speed of the internal combustion engine 50 with the AI pipe 1 of this example embodiment and AI pipes of related art, i.e., AI pipe 1X, and AI pipe 1Y. Also, in FIG. 4, the bold solid line is a graph showing the relationship between the sound pressure level and the speed of the internal combustion engine 50 with the AI pipe 1, the thin solid line is a graph showing the relationship between the sound pressure level and the speed of the internal combustion engine 50 with the AI pipe 1X, and the broken line is a graph showing the relationship between the sound pressure level and the speed of the internal combustion engine 50 with the AI pipe 1Y. The AI pipe 1Y is a pre-existing AI pipe that is used as the base for the AI pipe 1 and the AI pipe 1X. The AI pipe 1X is an AI pipe in which the wall sections and sheet thicknesses of the thin metal sheets used for the AI pipe 1Y were modified. The AI pipe 1 is the same as the AI pipe 1X but with through-holes H formed in it. The sheet thicknesses of the thin metal sheets were modified from 1.5 mm and 1.0 mm, which are the thicknesses of the thin metal sheets of the AI pipe 1Y, to 1.5 mm for both of the thin metal sheets used for the AI pipe 1X. Also, the wall sections were modified by forming the first and second wall sections W1 and W2 of the AI pipe 1X so that the surface area and the passage sectional area of the pipe portion 31 are as small as possible yet large enough to ensure the flowrate of secondary air. Also, the sound pressure level was a frequency of 3.15 kHz and was measured at a position 1 m to the right of the internal combustion engine 50.

As is evident from the graph in FIG. 4, with the AI pipe 1Y, there is a large variation in sound pressure level, and moreover, the sound pressure level is higher throughout the entire engine speed region than it, is with the AI pipe 1 and the AI pipe 1X. In contrast, with the AI pipe 1X, the sound pressure level is lower particularly in the low to mid engine speed region due to the modifications that were made to the sheet thicknesses of the thin metal sheets and the wall sections. Also with the AI pipe 1X, the foregoing modifications increased the damping effect, and as a result, a tendency for the sound pressure level to increase due to fluctuation in exhaust gas pressure the higher the engine speed becomes remarkably apparent. In contrast, with the AI pipe 1, forming the through-holes H not only further increased the damping effect, but also resulted in the sound pressure level being lower than that of the AI pipe 1X in the encircled region in the drawing.

Also, in this example embodiment, the through-holes H are formed by punching prior to forming the pipe in the same manufacturing process that the press work is performed in. As a result, there is no need for, equipment and the like to perform the machining to form the through-holes H after the pipe is formed, which obviates the need to invest in new equipment, or the number of labor hours and the number of hours for management and the like can be reduced to less than those required to finish the AI pipe 1 using another manufacturing process for machining, thus enabling an increase in cost to be kept down to a large degree. Also, forming the through-holes H does not change the outer shapes of the clamping portions C1 and C2 so even if the through-holes H are formed by punching beforehand, the first and second housings 11 and 21 can still be held sufficiently at the clamping portions C1 and C2 during press forming. In this example embodiment, the secondary air supply component is realized by the AI pipe 1.

In this example embodiment, through-holes H of generally the same shape and size are formed in all of the clamping portions C1 and C2 of the AI pipe 1. However, the invention is not limited to this. For example, instead of the through-holes H, through-holes of different shapes may be formed in the appropriate number and size in appropriate positions in the clamping portions C1 and C2. Also, through-holes do not always have to be formed in all of the clamping portions C1 and C2. Accordingly, in a case in which forming the through-holes in the clamping portions C1 and C2 beforehand by punching would cause the clamping portions C1 and C2 to be insufficiently strong, for example, it is possible to sufficiently ensure the strength necessary to hold the first and second housings 11 and 21 during press forming by forming other through-holes as appropriate instead of the through-holes H. Also, in this example embodiment, the AI pipe 1 was exemplified as a part that is particularly prone to producing vibration noise due to, for example, fluctuation in exhaust gas pressure. However, the invention is not limited to this. That is, with a vehicle component that includes a part made of thin metal sheets and which has a clamping portion that has been left on, such as the first and second housings 11 and 21 illustrated in foregoing example embodiment, it is possible to reduce the weight and vibration noise by forming through-holes in the clamping portion, even in the case of a three way catalyst or a sound absorber, for example. As a result, it is possible to realize the AI pipe 1 which can both reduce the extra weight as well as the vibration noise caused by those clamping portions C1 and C2 being on the AI pipe 1, and keep the costs necessary to realize these reductions in weight and vibration noise down.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A vehicle component comprising:
   a pipe made of a metal sheet and having an outflow portion and at least one clamping portion to be fixed to production equipment when the pipe is formed by press working, and the outflow portion of the pipe being connected to an internal combustion engine thereby the pipe is attached to the internal combustion engine,
   wherein the at least one clamping portion has a free end when the pipe is connected to the internal combustion engine;
   wherein at least one through-hole is formed in the at least one clamping portion so as to reduce a vibration noise generated by the at least one clamping portion when the vehicle component is mounted on the internal combustion engine; and
   wherein the at least one clamping portion is not directly connected to the internal combustion engine in the case where the vehicle component is mounted on the internal combustion engine.

2. The vehicle component according to claim 1, wherein the at least one through-hole is formed by being punched out in the press working.

3. The vehicle component according to claim 1, wherein the metal sheet is a light alloy.

4. The vehicle component according to claim 1, wherein the at least one through-hole is a round hole.

5. The vehicle component according to claim 1, wherein the pipe has a flange portion having a predetermined width, and the at least one clamping portion is formed protruding out from the flange portion.

6. A secondary air supply component of an internal combustion engine, comprising:
   a first part made of a metal sheet and having:
      a first wall section that forms a first part of a secondary air passage, and that is formed by press working in production equipment; and
      a first clamping portion that is to be fixed to the production equipment when the first wall section is formed by press working; and
   a second part made of the metal sheet and having:
      a second wall section that forms a second part of the secondary air passage, and that is formed by press working in the production equipment, and a second clamping portion that is to be fixed to the production equipment when the second wall section is formed by the press working,
   wherein each of the first clamping portion and the second clamping portion has a free end when the secondary air supply component is attached to the internal combustion engine;
   wherein the second wall section of the second part is fitted together with the first wall section of the first part to form the secondary air passage,
   wherein at least one through-hole is formed in at least one of the first clamping portion and the second clamping portion so as to reduce the a vibration noise generated by the corresponding clamping portion; and
   wherein the first clamping portion and the second clamping portion are not directly connected to the internal combustion engine in the case where the secondary air supply component is attached to the internal combustion engine.

7. The secondary air supply component of an internal combustion engine according to claim 6, wherein the at least one through-hole is formed by being punched out in the press working.

8. The secondary air supply component of an internal combustion engine according to claim 6, wherein:
   the first part has a first flange portion formed protruding out from the first wall section, and the first clamping portion is formed protruding out from the first flange portion; and
   the second part has a second flange portion formed protruding out from the second wall section, and the second clamping portion is formed protruding out from the second flange portion.

9. The secondary air supply component of an internal combustion engine according to claim 6, wherein the first part has a first flange portion formed protruding out from the first wall section; the second part has a second flange portion formed protruding out from the second wall section; and the first flange portion of the first part and the second flange portion of the second part are fit together and joined by welding.

10. The secondary air supply component of an internal combustion engine according to claim 6, wherein the first part and second part form an air channel therebetween.

11. The secondary air supply component of an internal combustion engine according to claim 6, wherein the secondary air supply component is attached to the internal combustion engine by connecting an outflow portion of the secondary air supply component to the internal combustion engine.

* * * * *